March 5, 1940.　　H. ALLEN ET AL　　2,192,425

VALVE GUIDE

Filed Aug. 3, 1937

Herbert Allen.
Joseph A. Tennant.
Madden T. Works
INVENTORS

BY J. Vincent Martin
and Ralph R. Browning
ATTORNEYS

Patented Mar. 5, 1940

2,192,425

UNITED STATES PATENT OFFICE 2,192,425

VALVE GUIDE

Herbert Allen, Joseph A. Tennant, and Madden T. Works, Houston, Tex., assignors to Abercrombie Pump Company, Houston, Tex., a corporation of Texas Application August 3, 1937, Serial No. 157,168

1 Claim. (Cl. 251—144)

This invention relates to a valve guide for use in connection with the exhaust or inlet of pumps and the like.

It is an object to provide a guide for a valve element of a pump such as referred to, which guide shall be extremely simple and efficient in its operation.

It is a further object of this invention to provide a valve guide for a reversible valve element, which valve guide shall be inexpensive to manufacture and of such a nature as not to interfere with the action or reversal of the valve element.

Other objects and advantages of this invention will become apparent from the following description taken in connection with the accompanying drawing, the same being by way of illustration and example only and not by way of limitation.

Figure 1:
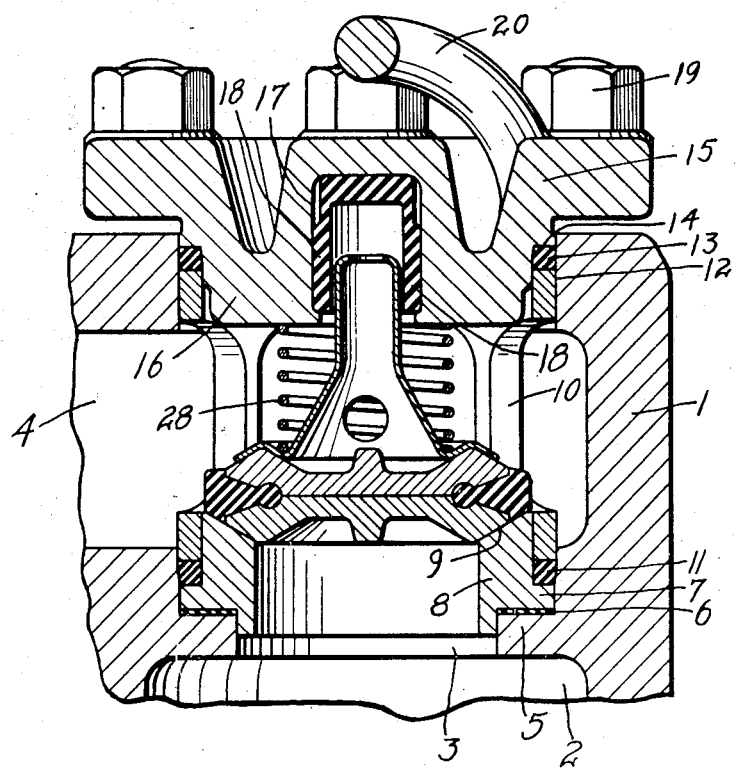
Fig. 1 is a cross sectional view illustrating a valve constructed in accordance with this invention in place within the body of a pump.
Figure 2:
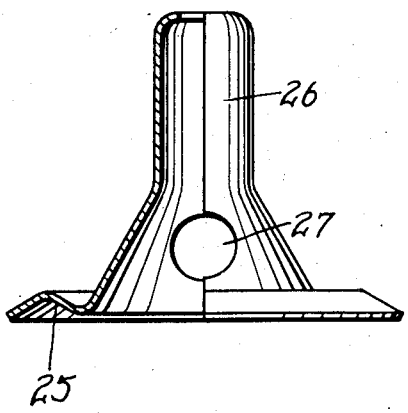
Fig. 2 is an enlarged elevation partly in section showing the guide for the valve illustrated in Fig. 1.

As illustrated in Fig. 1, the valve is located within the body 1 of a pump and is adapted to permit the passage of liquid upwardly from the chamber 2 through the passageway 3 and into the chamber 4, but to prevent a reverse flow of such liquid. The body 1 is provided with an inwardly extending flange 5 about the opening 3, said flange being adapted to receive the gasket 6, and the flange 7 of the valve seat member 8 having the valve seat 9 at its upper end. The valve seat member 8 is held in position by means of a cage 10, the lower end of which bears against a gasket 11 seated upon the upper surface of the flange 7. The upper end of the cage 10 fits within an opening 12 in the body 1 and is adapted to receive a gasket 13 and the shoulder 14 of the cover plate 15. The cover plate 15 has a downwardly extending part 16 which extends into the interior of the cage 10 and is provided centrally with an opening 17 lined with a bushing 18 for a purpose to be presently set forth. The cover plate 15 is held in place by means of studs or bolts 19, and is provided with a handle or bail 20 by which it may be handled when removed.

Figure 3:
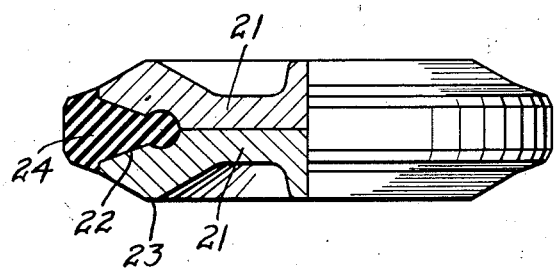
Fig. 3 is an enlarged view partly in section illustrating the valve element shown in Fig. 1.

The valve element proper consists of two identical metallic elements 21 so shaped that when placed back to back there will be formed an annular groove 22 circumferentially with respect to the elements 21 between their outer edges. Each element 21 is also formed with an annular ridge 23. These elements 21 are secured in the relation illustrated in Figs. 1 and 3 by means of a bonding edge such as rubber or the like, and the groove 22 is filled with rubber or similar substance as shown at 24, this filling material being so formed as to extend radially beyond the outer circumference of the elements 21 and form a circumferential lip of a slightly flexible nature. The valve element thus formed is identical on both of its sides and is capable of seating against the valve seat 9 regardless of which face is placed against said valve seat. This element furthermore will positively seat against the valve seat 9 by virtue of the contact between the lower element 21 and the valve seat, and will form a perfect seal against the valve seat 9 by virtue of the flexible lip member 24.

The guide element is formed with an annular downwardly facing groove 25 adapted to seat upon the annular ridge 23 of the valve element and is formed with an upstanding hollow stem-like part 26 adapted to fit within and be guided by the opening in the bushing 18. Holes 27 are formed in the body of the guide element so that liquid may pass freely into and out of the same and prevent any liquid lock or binding which might otherwise result.

For the purpose of holding the guide member in contact with the valve element and for urging the valve element at all times toward the seat 9, there is provided a spring 28 which surrounds the up-standing stem 26 of the guide member and bears against the guide member just above and inwardly of the annular groove 25.

From the foregoing, it will be appreciated that upon the tendency of a liquid or fluid to move from the chamber 2 through the opening 3 and into the chamber 4, the valve element will be lifted from its seat against the tension of the spring 28 and will be guided in its upward movement by the guiding element described and by the cooperation between said guiding element and the bushing 18. When the tendency of the liquid or fluid to flow upwardly has ceased, the spring 28 bearing against the guiding element will cause the downward movement of the guiding element and of the valve element until the valve element has seated against its seat 9. As previously stated, when in this position, the lower element 21 will seat firmly against the seat 9 and the flexible lip portion 24 will be forced by the fluid pressure within the chamber into sealing engagement with the seat 9.

When the valve element has become worn on one side so that it is no longer fit for use, it may be reversed and the opposite face thereof utilized, until both faces have been worn out. Then the valve element only need be discarded and replaced with a new one.

Thus, a means has been provided whereby all of the objects and advantages set forth in connection with this invention have been attained.

Having described our invention, we claim:

A guide member for a reversible valve element, said guide member comprising a lower conical hollow body portion and an upper hollow stem-like tubular portion, said conical portion having at its lower edge a laterally extending flange defining a marginal recess adapted to receive a spring for urging said guide member towards said valve element, said conical portion serving further to guide said spring into said recess, said flange consisting of an upwardly and outwardly extending portion and a downwardly and outwardly extending portion defining a downwardly presented groove adapted to cooperate with a ridge portion of said valve element, said stem-like tubular portion being open at its upper end adapted to fit into a guide opening, said lower conical portion having a lateral opening remote from the opening in said stem-like tubular portion.

HERBERT ALLEN.
JOSEPH A. TENNANT.
MADDEN T. WORKS.